US007523553B2

(12) United States Patent
Ohsumi et al.

(10) Patent No.: US 7,523,553 B2

(45) Date of Patent: Apr. 28, 2009

(54) METHOD OF MANUFACTURING INK JET RECORDING HEAD

(75) Inventors: Masaki Ohsumi, Yokosuka (JP); Shuji Koyama, Kawasaki (JP); Yoshinori Tagawa, Yokohama (JP); Hiroyuki Murayama, Kawasaki (JP); Kenji Fujii, Kawasaki (JP); Yoshinobu Urayama, Fujisawa (JP); Jun Yamamuro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/669,535

(22) Filed: Jan. 31, 2007

(65) Prior Publication Data

US 2007/0178248 A1 Aug. 2, 2007

(30) Foreign Application Priority Data

Feb. 2, 2006 (JP) ............................ 2006-025777

(51) Int. Cl.
*B23P 17/00* (2006.01)

(52) U.S. Cl. .................... 29/890.1; 29/890.09; 216/27; 347/65

(58) Field of Classification Search ................ 29/890.1, 29/832, 844, 846, 847, 848, 852, 611, 830, 29/831, 854; 347/47, 65, 54, 44, 64, 20, 347/68–70; 216/27, 41; 427/555; 430/320, 430/326

See application file for complete search history.

(56) References Cited

U.S. PATENT DOCUMENTS

| | | | | |
|---|---|---|---|---|
| 5,458,254 | A * | 10/1995 | Miyagawa et al. | 216/27 |
| 5,478,606 | A * | 12/1995 | Ohkuma et al. | 427/555 |
| 5,730,889 | A * | 3/1998 | Miyagawa et al. | 216/27 |
| 5,859,654 | A * | 1/1999 | Radke et al. | 347/45 |
| 6,390,606 | B1 | 5/2002 | Terui et al. | |
| 6,412,918 | B1 * | 7/2002 | Chen et al. | 347/56 |
| 6,591,500 | B1 * | 7/2003 | Suzuki et al. | 29/890.1 |
| 6,659,588 | B2 * | 12/2003 | Ikegame et al. | 347/40 |
| 6,799,831 | B2 * | 10/2004 | Inamoto et al. | 347/44 |
| 7,282,243 | B2 | 10/2007 | Ohkuma et al. | |
| 2004/0070643 | A1 | 4/2004 | Kubota et al. | |
| 2006/0098055 | A1 | 5/2006 | Fujii et al. | |
| 2007/0017894 | A1 | 1/2007 | Murayama et al. | |
| 2007/0207414 | A1 | 9/2007 | Murayama et al. | |
| 2007/0252872 | A1 | 11/2007 | Fujii et al. | |

FOREIGN PATENT DOCUMENTS

| | | |
|---|---|---|
| KR | 2004-0005692 | 1/2004 |
| KR | 2004-0070431 | 8/2004 |

OTHER PUBLICATIONS

Excerpt of Korean chemical term dictionary, p. 460, and transaltion.

* cited by examiner

*Primary Examiner*—Minh Trinh
*Assistant Examiner*—Tai Nguyen
(74) *Attorney, Agent, or Firm*—Fitzpatrick, Cella, Harper & Scinto

(57) ABSTRACT

A method of manufacturing an ink jet recording head includes the steps of forming adhesive layers and side walls of a flow path on a substrate; pasting a ceiling layer, which is a part of a flow path forming member, on the side walls; and forming discharge ports in the ceiling layer.

5 Claims, 5 Drawing Sheets

METHOD OF MANUFACTURING INK JET RECORDING HEAD

BACKGROUND OF THE INVENTION

1. Field of the Invention

The present invention relates to a method of manufacturing a high-accuracy ink jet recording head.

2. Description of the Related Art

An ink jet recording head is a recording head of discharging ink on a recording medium such as a sheet of paper, a resin sheet or the like by utilizing the function of an energy generating element such as a piezoelectric element, a heat element or the like to display a character, a sign, a figure and the like. The ink jet recording head is produced by using a semiconductor film formation technique using photolithography on a substrate, and there is known one building therein an electric control circuit for driving the energy generating element in response to a request of miniaturization and densification.

As these methods of manufacturing an ink jet recording head, ones disclosed in U.S. Pat. No. 5,478,606 and U.S. Pat. No. 6,390,606 are known. In the following, a description is given by using FIGS. 4A to 4F. As shown in FIG. 4A, a substrate 21, on which a plurality of energy generating elements 22 such as heating resistors are arranged, is used, and a sacrifice layer 25 is provided at a position of forming a through-hole for forming an ink supply port, which will be described later. A protective layer 24 is laminated on the sacrifice layer 25 and the energy generating elements 22 to cover them. A substrate which is made of a silicon single crystal having a crystal orientation 100 and the whole back surface of which is covered by a $SiO_2$ film 23 is used as the substrate 21.

As shown in FIG. 4B, a polyether amide resin is coated on the protective layer 24 on the front surface of the substrate 21 and on the $SiO_2$ film 23 on the back surface of the substrate 21, and the polyether amide resin film is heated to be cured. Then, the cured polyether amide resin on the front and the back surfaces of the substrate 21 is patterned by the photolithography to form polyether amide resin layers 26 and 27. The polyether amide resin layers 26 and 27 are formed by coating a positive type resist on the cured polyether amide resin by a spin coat method or the like to expose and develop the coated resist. Then, after the polyether amide resin has been patterned by dry etching or the like, the positive type resist remaining at non-exposed portions caused by a mask (the portions on the polyether amide resin layers 26 and 27 which have not been etched) is exfoliated.

As shown in FIG. 4C, a positive type resist that can be dissolved by a solution is coated at a portion to be a flow path of ink to form mold materials 28 patterned by the photolithography.

Next, as shown in FIG. 4D, a covering photosensitive resin is coated on the mold materials 28 by the spin coat method or the like to form a flow path forming member 29. A water repellent material 30 is formed on the flow path forming member 29 by laminating a dry film made of a water repellent resin or the like. Ink discharge ports 31 are formed in the flow path forming member 29, on which the water repellent material 30 is laminated. The ink discharge ports 31 are formed by patterning the flow path forming member 29, on which the water repellent material 30 is laminated, by the photolithography using an ultraviolet (UV) ray, a deep UV ray or the like.

As shown in FIG. 4E, the front surface and the side surface of the substrate 21, on which the mold materials 28, the flow path forming member 29 and the like are formed, are covered by a protective material 32 by the spin coat method or the like.

As shown in FIG. 4F, an etching starting surface for forming the through-hole of the substrate 21 on the $SiO_2$ film 23 is exposed on the back surface of the substrate 21 by the dry etching using the polyether amide resin layers 27 as masks.

Next, anisotropic etching by wet etching is performed from the etching starting surface of the back surface of the substrate 21. After the end of the anisotropic etching of the substrate 21, isotropic etching of the sacrifice layer 25 is continuously performed by the strong alkali solution used for the wet etching to form the through-hole in the substrate 21, and then an ink supply port 33 is formed. After that, the polyether amide resin layers 27 and the protective material 32 are removed by the dry etching, and the mold materials 28 are eluted from the ink discharge ports 31 and the ink supply port 33 by a solution to form an ink chamber space.

The substrate 21, in which a plurality of ink chambers are formed by the processes described above, is cut to be separated and to be made to be chips with a dicing saw or the like, and electric joining for supplying electric power to the energy generating elements 22 is performed. Then, the substrate 21 is connected to an ink supply path connected to an ink storage portion, and consequently an ink jet recording head is obtained.

In the manufacturing method described above, the polyether amide resin layers 26 are used for enhancing the adhesion property between the substrate 21 and the flow path forming member 29.

The manufacturing method described above is one excellent in utility, but an ink discharge rate is very small, and has a limitation in dimension designing because the finished dimension tolerances of the adhesive layers and the wall members of the flow paths are different from each other in the case where a head in which the arrangement density of its discharge ports is high (for example, a head having a discharge rate of 1 pl and the arrangement density of its discharge ports is 1200 dpi) is manufactured. Moreover, there is a case where the adhesion forces between the adhesive layers and the wall members of the flow paths lower owing to the finished dimensional tolerances of the adhesive layers and the mold materials or a case where an ink discharge performance is affected by the tolerances.

SUMMARY OF THE INVENTION

The present invention was made in consideration of the aforesaid discussion. The present invention can provide a method of manufacturing an ink jet recording head that can obtain an ink jet recording head in which discharge ports to discharge ink in the form of infinitesimal liquid drops are arranged in a high density with high accuracy at a low price.

The present invention is, for example, a method of manufacturing an ink jet recording head including a substrate equipped with an energy generating element for generating energy to discharge ink, and a supply port for supplying the ink to the energy generating element; a discharge port for discharging the ink, the discharge port formed in the substrate; and a flow path forming member for forming a flow path to make the discharge port communicate with the supply port, the method including the steps of: forming side walls of the flow path on the substrate; pasting a layer on the side walls, the layer being a part of the flow path forming member; and forming the discharge port in the layer.

According to the method of manufacturing an ink jet recording head of the present invention, the number of processes of photolithography for forming a pattern is decreased and mold materials for forming a flow path becomes unnecessary by pasting the layer forming the discharge port on the side walls of the flow path. Consequently, an ink jet recording head can be manufactured with good efficiency at a low price.

Moreover, limitations on dimension designing can be lessened by forming the side walls of the flow path and the adhesive layer by patterning after the material of the adhesive layer and the material of the flow path forming member have been laminated.

Further features of the present invention will become apparent from the following description of exemplary embodiments with reference to the attached drawings.

DESCRIPTION OF THE EMBODIMENTS

In the following, the method of manufacturing an ink jet recording head of the present invention will be described with reference to the attached drawings.

Figure 1:
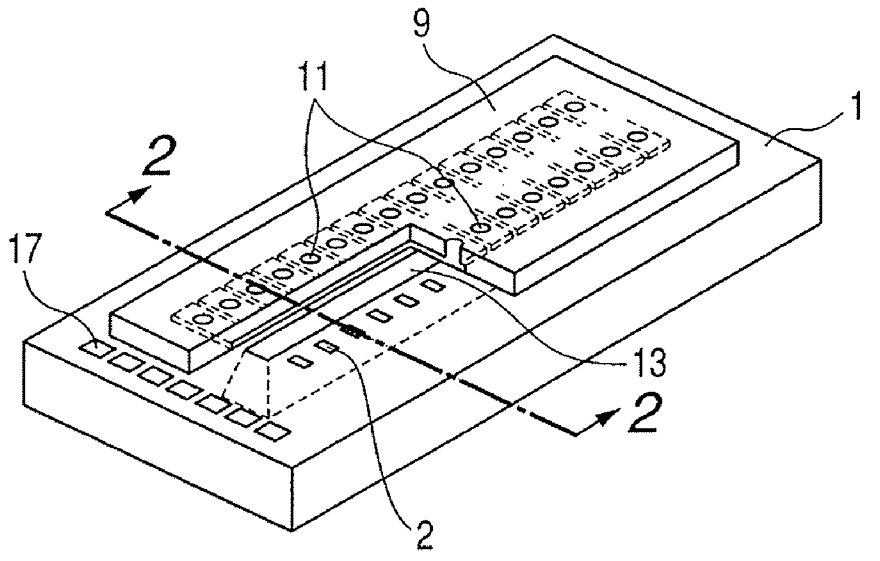
FIG. 1 is a schematic perspective view showing an ink jet recording head manufactured by an embodiment of the method of manufacturing an ink jet recording head of the present invention.
Figure 2:
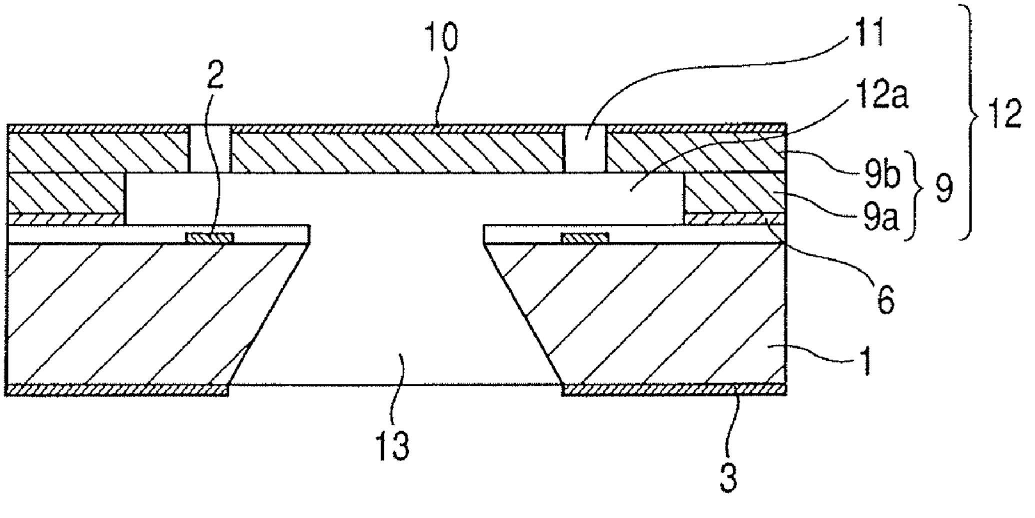
FIG. 2 is a schematic sectional view of the ink jet recording head manufactured by the embodiment of the method of manufacturing an ink jet recording head of the present invention.

As an ink jet recording head manufactured by the method of manufacturing an ink jet recording head of the present invention, there can be cited an ink jet recording head shown in the schematic perspective view of FIG. 1 and the schematic sectional view of FIG. 2 taken along a line 2-2 in FIG. 1 as an example. The ink jet recording head shown in FIGS. 1 and 2 includes a plurality of energy generating elements 2 formed on the front surface of a substrate 1 made of silicon or the like, wall members 9 formed on the substrate 1 with adhesive layers 6 put between them, and discharge ports 11 for discharging ink by the operation of the energy generating elements 2. The ink jet recording head also includes an ink supply port 13, which is formed to penetrate the substrate 1 to couple an unshown ink supply path, which is formed on the back surface side of the substrate 1 to be connected to an unshown ink storage unit, with a flow path connected to each of ink discharge ports 11. The adhesive layer 6 is not essential to the present invention. However, the adhesive layer 6 may be selected in accordance with material of the substrate 1 and the flow path forming member 9 and used to improve the adhesivity between the substrate 1 and the flow path forming member 9.

In the ink jet recording head as shown the discharge port 11 is opposite to the energy generating element 2. However, the present invention is not limited to this arrangement and the positional arrangement between the discharge port 11 and the energy generating element 2 may be designed in other manners.

It is preferable that the substrate 1 is a silicon single crystal body. If the forming of the through-holes of the substrate 1 is performed by the anisotropic etching, the substrate 1 is preferably a silicon single crystal body having a crystal orientation 100. If the forming of the through-holes of the substrate 1 is performed by the dry etching and an excimer laser, the substrate 1 may be also a silicon single crystal body having a crystal orientation 110 or the like. Both the front and the back surfaces of the silicon substrate 1 may be severally covered by a thermally-oxidized film of a silicon oxide film, and a membrane portion where the thermally-oxidized film is removed may be formed in the thermally-oxidized film formed on the front surface of the silicon substrate 1.

A plurality of rows, e.g. two rows, of the energy generating elements 2 formed on the substrate 1 may be formed in parallel at a predetermined pitch. Any energy generating element can be used as the energy generating elements 2 as long as the energy generating element can generate the energy capable of discharging ink as fine liquid drops, such as liquid drops each having a volume of 1 pl, and specifically a piezoelectric element, a heat element and the like can be cited. A protective film 4 made of Ta or the like may cover such discharge energy generating elements 2 in order to suppress the corrosion caused by ink and to electrically insulate the discharge energy generating elements 2. The protective film 4 may be formed over the whole front surface of the substrate 1 in order to cover unshown wiring connecting the energy generating elements 2 with electrode pads 17.

The adhesive layers 6 formed on the substrate 1 are formed by being patterned at portions of the substrate 1 where the flow path side walls 9*a* are formed in order to make the flow path side walls 9*a* adhere closely to the substrate 1. The adhesive layers 6 are made of a material containing a polyether amide resin or an epoxy resin, which have a high adhesion property to the flow path side walls 9*a*.

A flow path forming member 9 formed on the front surface side of the substrate 1 with the adhesive layers 6 put between them includes a flow path 12*a* and the ink discharge ports 11. The flow path 12*a* is formed of the side walls 9*a* adhering closely to the adhesive layers 6 and a layer 9*b*, which will be described later and constitutes a ceiling member. The flow path 12*a* is formed so that the discharge energy generated by the energy generating elements 2 may be transmitted through the protective film 4. The discharge ports 11 are formed in the layer 9*b* at the positions opposed to the energy generating elements 2. Although, the flow path side walls 9*a* are preferably made of a photosensitive material containing the photosensitive resin and a photopolymerization initiator from the viewpoint of patterning with high accuracy, the flow path side walls 9*a* are not limited to those made of the photosensitive material. A resin material and a metallic material can be selected as the material of the layer 9*b* constituting the ceiling member, but the material having the same quality as those of the flow path side walls 9*a* are preferable because the influences exerted by the manufacturing processes, the environments after the manufacturing and the like are the same. It is preferable that a water repellency agent layer 10 is formed on the top surface of the layer 9*b* because the adhesion of the splashes of the ink discharged from the ink discharge ports 11 can be suppressed.

The ink supply port 13 formed to penetrate the substrate 1 is to make the unshown ink supply path formed on the back surface side of the substrate 1 connected to the unshown ink storage portion communicate with the flow path 12*a*. In the present embodiment, the ink supply port 13 is formed to be opened between the rows of the energy generating elements 2, which are arranged in two rows. The ink supply port 13 may include a tapered portion, or may include an aperture of the same form on each of the front and the back surfaces of the substrate 1.

In the following, the method of manufacturing an ink jet recording head of the present invention is sequentially described according to the processes thereof with reference to FIGS. 3A to 3G showing schematic sectional views of the cross-section taken along the line 2-2 in FIG. 1.

First Embodiment

An adhesive material for forming the adhesive layers 6 on the substrate 1 equipped with the energy generating elements 2 is laminated (adhesive material lamination process).

First, a plurality of the energy generating elements 2 such as heating resistors or the like is formed in, for example, two parallel rows at the predetermined pitch, as described above, on the front surface of the substrate 1, which is made of silicon or the like, and the whole back surface of which is covered by a $SiO_2$ film 3. Electrodes and wiring for supplying electric power to drive the energy generating elements 2 arranged in two parallel rows are connected to the energy generating elements 2. Moreover, a sacrifice layer 5 is formed between the energy generating elements 2. The sacrifice layer 5 is formed in order to suppress the increases of the errors of the calibers of the apertures on the upper side of the substrate 1, which errors are caused by the changes of the thickness of the substrate 1, in the case where the through-hole to be the ink supply port 13 is formed by the anisotropic etching, and it is preferable to form the sacrifice layer 5 with a material having a quality of dissolving into a solution used for the anisotropic etching. As such a material having the dissolving quality, there can be cited polysilicon, and aluminum, aluminum silicon, aluminum copper and aluminum silicon copper, the etching speeds of which are fast, in the case where the solution used for the anisotropic etching is a strong alkali solution such as tetramethyl ammonium hydroxide (TMAH). The protective film 4 having the quality described above is formed on the silicon substrate 1, on which the energy generating elements 2 and the sacrifice layer 5 have been formed. In addition, their descriptions and illustrations thereof are omitted.

Figure 3A:
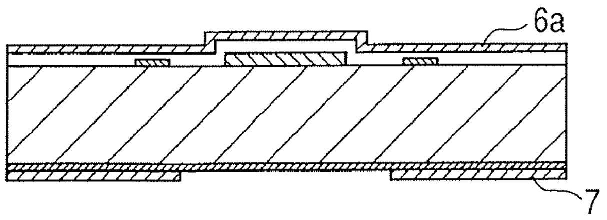
FIGS. 3A, 3B, 3C, 3D, 3E, 3F and 3G are schematic sectional views showing an example of the method of manufacturing an ink jet recording head of the present invention.

As shown in FIG. 3A, an adhesive material 6*a* to form the adhesive layers 6 is laminated on the protective film 4. At this process, the adhesive material 6*a* is made to be in the laminated state, and the patterning to form the adhesive layers 6 is not performed. The method of forming the adhesive material 6*a* is that of dissolving polyether amide resin into a solvent, and then heating the solution to form the adhesive material 6*a*. Alternatively, the adhesive material 6*a* can be formed by dissolving a resin containing the epoxy resin and a curing agent into a solvent and by performing its coating and curing to form a film. These adhesive layers 6 can be formed as the need arises, and their thicknesses are suitably to be within a range of from about 2 to about 3 μm.

Resin layers 7 to be the mask layers of the anisotropic etching are formed on the back surface of the substrate 1. The resin layers 7 are formed by coating a solution of a polyether amide resin with a spin coater or the like, by heating and curing the solution, and by patterning the cured layer. Solutions of resins other than the polyether amide resin can be also used.

Figure 3B:
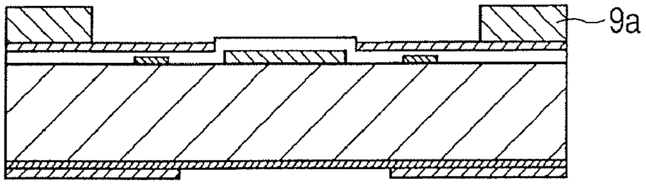

Next, as shown in FIG. 3B, a flow path forming material 8 containing a photosensitive resin is laminated on the adhesive layer material 6*a* to form the side walls 9*a* of the flow path 12*a* by exposure and development (side wall forming process).

Because the material for forming the flow path forming member contains the photosensitive resin, it becomes possible to perform the patterning by the photolithography. Such a flow path forming material 8 is coated on the adhesive layer material 6*a* by, for example, the spin coat method.

Figure 3C:
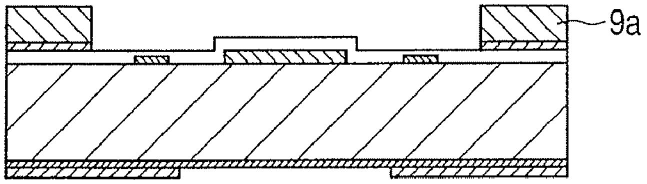

After the coating, the flow path forming material 8 is exposed and cured by an ultraviolet ray, a deep UV ray or the like through the mask. After that, the flow path forming material 8 is developed to be formed as the flow path side walls 9*a* as shown in FIG. 3C. After that, using the flow path side walls 9*a* as the mask, the adhesive layer material 6*a* is etched by the dry etching or the like, and is removed, only the portions existing between the flow path side walls 9*a* and the substrate 1 remaining. Thus, the adhesive layers 6 are formed.

Next, a through-hole to be the ink supply port 13 is formed from the back surface side of the silicon substrate 1 (ink supply port forming process). In addition, the timing of performing the process is not essential to the present invention, and the process may be performed after a discharge port forming process shown in FIG. 3G.

Figure 3D:
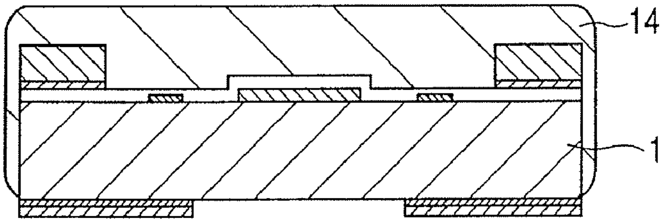

As shown in FIG. 3D, the front surface and the side surface of the substrate 1 are covered by a protective material 14 by the spin coat method or the like. The protective material 14 is provided for protecting the ink chamber side wall members from the damages at the time of conveyance, and for producing an etching resistant property at the time of forming the ink supply port 13 from the back surface of the substrate 1.

The $SiO_2$ film 3 on the back surface of the substrate 1 is etched using the polyether amide resin layers 7 as the mask, and the portion of the substrate 1 that is the starting surface of the etching to form the through-hole of the substrate 1 in order to form the ink supply port 13 is exposed.

Figure 3E:
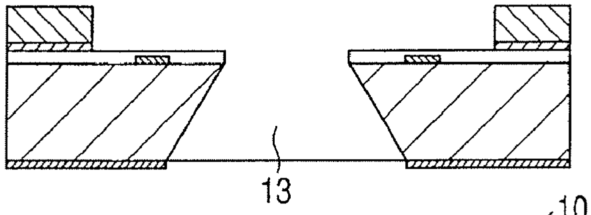

As shown in FIG. 3E, the etching is performed from the etching starting surface formed on the back surface of the substrate 1, and the through-hole to become the ink supply port 13 is formed. Such etching may be performed by any of the methods of the dry etching, the etching using an excimer laser, the wet etching, and a combination of them, but the anisotropic etching by the wet etching is preferable because it can be easily performed. A strong alkali solution such as the solution of TMAH can be used for the anisotropic etching. The through-hole is formed in the substrate 1, and continuously the isotropic etching of the sacrifice layer 5 formed on the front surface of the substrate 1 is performed to form the ink supply port 13. After that, the resin layers 7 and the protective material 14 on the back surface of the substrate 1 are removed.

Next, a layer constituting a part of the flow path forming member is pasted on the side walls of the flow path 12*a* of the substrate 1 (layer pasting process).

Figure 3F:
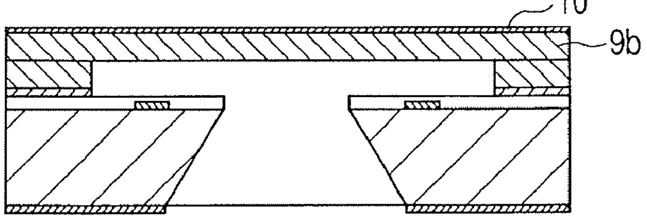

As shown in FIG. 3F, the layer constituting the ceiling member 9*b* of the ink chamber is pasted on the side wall members 9*a*. Any layer constituting the ceiling layer 9*b* may be used as the layer as long as it has rigidity at the degree capable of being not bent when it is placed on the side walls 9*a*. As the quality of material of the layer constituting the ceiling layer 9*b*, for example, a material containing a photosensitive resin and a photo cationic polymerization initiator is preferable because it makes it possible to form the ink discharge ports 11 by the development by the photolithography without performing any etching. Moreover, the quality of material of the dry film preferably has the same composition as that of the flow path side walls 9*a*. For example, if the side walls 9*a* are cured materials of the epoxy resin, the layer constituting the ceiling layer 9*b* is preferably the one containing an epoxy resin and a curing agent. In particular, if the epoxy resin used for the side walls 9*a* and the epoxy resin contained in the layer constituting the ceiling member 9*b* are the same, it is further preferable.

It is preferable to laminate the water repellency agent layer 10 on the front surface of the layer 9*b*.

Figure 3G:
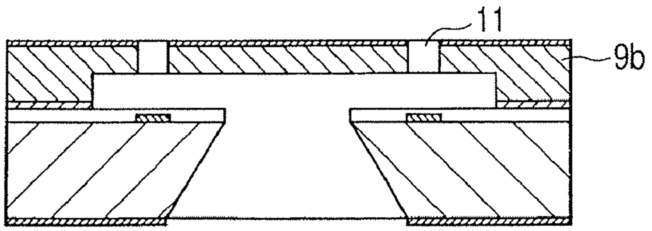
Figure 4A:
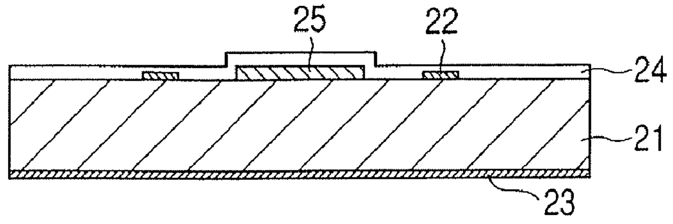
FIGS. 4A, 4B, 4C, 4D, 4E and 4F are schematic sectional views showing the processes of a conventional method of manufacturing an ink jet recording head.
Figure 4B:
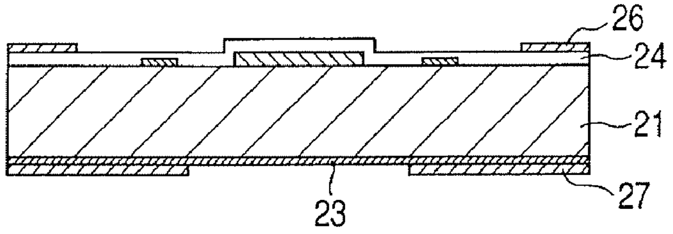
Figure 4C:
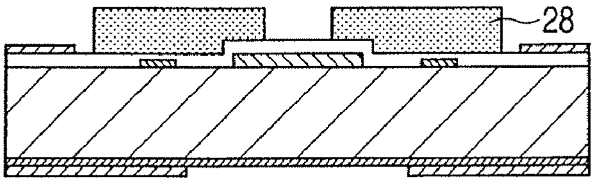
Figure 4D:
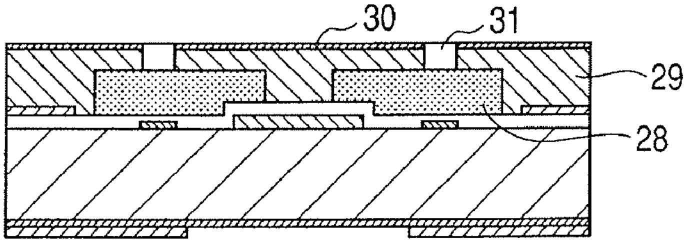
Figure 4E:
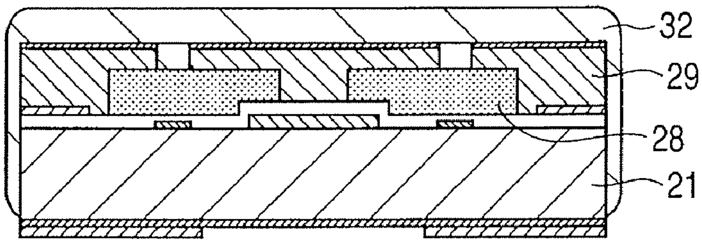
Figure 4F:
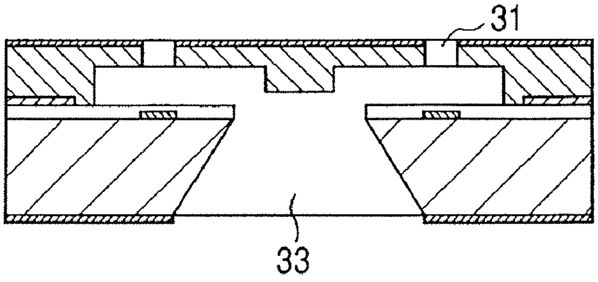

Next, as shown in FIG. 3G, the ink discharge ports 11 are formed in the layer (discharge port forming process). The formation is performed by exposing the dry film and curing the exposed portions. By the curing, the joining between the side walls 9*a* and the ceiling member 9*b* becomes more firm. If the materials of the side walls 9*a* and the dry film are the same ones, more firm joining of both the materials can be obtained from the viewpoint of the affinity of both the materials.

Electric joining for driving the energy generating elements 2 of the ink jet recording head obtained by the processes mentioned above is performed. Then, the ink discharge ports 11 are connected to the ink supply path 13 connected to the ink storage unit, and a unit of the ink jet recording head capable of being mounted on a recording apparatus can be completed.

Second Embodiment

As a second embodiment of the present invention, a case of using a photosensitive material as the adhesive layers 6 is described with reference to FIGS. 5A to 5C.

Figure 5A:
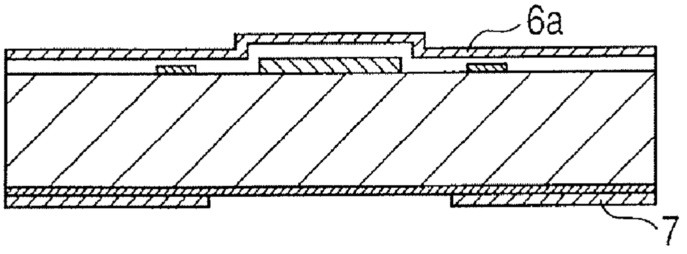
FIGS. 5A, 5B and 5C are schematic sectional views showing an example of the method of manufacturing an ink jet recording head of the present invention.

As shown in FIG. 5A, the adhesive material 6*a* to form the adhesive layers 6 is laminated on the protective film 4. Hereupon, usable materials as an adhesive material 6*b* are, for example, polyether amide, a crosslinking agent to crosslink the polyether amide under the existence of a catalyst such as an acid, and a photosensitive material to generate the catalyst by being exposed. To put it more concretely, there can be cited a melamine compound as the crosslinking agent, and a material known as a photoacid generator as the photosensitive material. Moreover, as the other examples of the adhesive material 6*b*, there can be cited a negative type photosensitive resin material containing the epoxy resin and the photoacid generator, and the like.

The polyether amide resin layers 7 to be the mask layers of the anisotropic etching are formed on the back surface of the substrate 1. The polyether amide resin layers 7 are formed by coating the solution of the polyether amide resin with a spin coater or the like, and by heating and curing the coated solution. Then, cured solution is patterned to form the polyether amide resin layers 7.

Figure 5B:
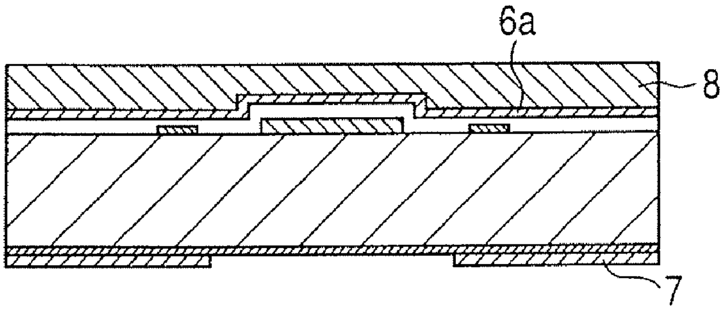

Next, as shown in FIG. 5B, the flow path forming material 8 having photosensitivity is laminated on the adhesive material 6*a*. As the flow path forming material 8, a material containing the photoacid generator and the epoxy resin is suitably used, but the material is not limited to the one containing the photoacid generator and the epoxy resin. It is desirable that the photosensitive wavelengths of the adhesive material 6*a* and the flow path forming material 8 overlap each other for later processes.

Figure 5C:
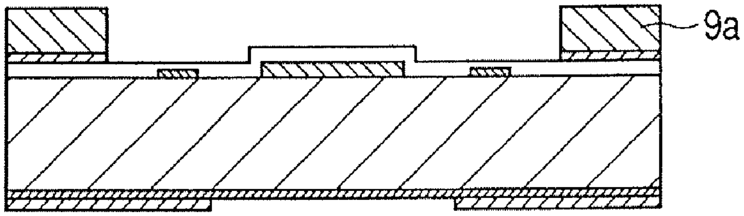

Next, as shown in FIG. 5C, the adhesive material 6*a* and the flow path forming material 8 are patterned all at one time to form the side walls 9*a* (flow path side wall forming process). If the photosensitive wavelengths of both of the materials 6*a* and 8 overlap each other, the adhesive material 6*a* and the flow path forming material 8 can be exposed by light radiation at the same time. The selection of a developing solution in a development is arbitrary, but it is further effective to perform the development using the same developing solution all at one time. It is needless to say that the selection is not limited to that case, but the development may be performed separately using different developing solutions.

By the process mentioned above, the patterning of the side walls 9*a* and the adhesive layers 6 can be performed all at one time, and the flow path side walls 9*a* can be obtained by a simple process.

The processes on and after that can be performed similarly to those illustrated in FIG. 3D-3G of the first embodiment.

Third Embodiment

A third embodiment of the present invention is described with reference to FIGS. 6A to 6D.

The present embodiment is an example of separating the process of forming the adhesive layers 6 and the process of forming the side walls 9*a* to increase the selectivity of the materials of both of them.

Figure 6A:
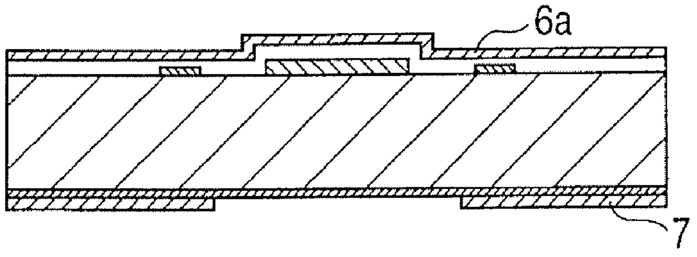
FIGS. 6A, 6B, 6C and 6D are schematic sectional views showing an example of the method of manufacturing an ink jet recording head of the present invention.

As shown in FIG. 6A, the adhesive material 6*a* to form the adhesive layers 6 is laminated on the protective film 4. As the adhesive material 6*a*, it is possible to use the adhesive materials described in the first and the second embodiments.

Figure 6B:
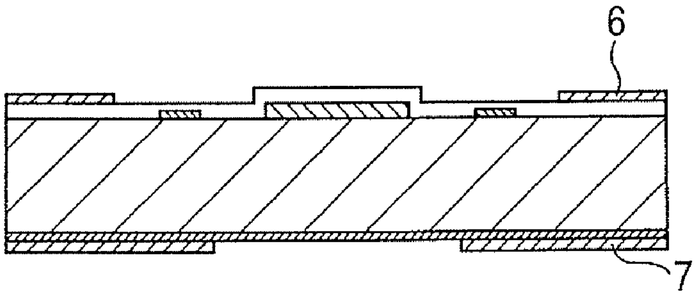

Next, as shown in FIG. 6B, the adhesive material 6*a* is patterned to form the adhesive layers 6. If the adhesive material 6*a* has photosensitivity, the patterning is performed by using the technique of photolithography. If the adhesive material 6*a* does not have photosensitity, the patterning is performed by etching or the like.

Figure 6C:
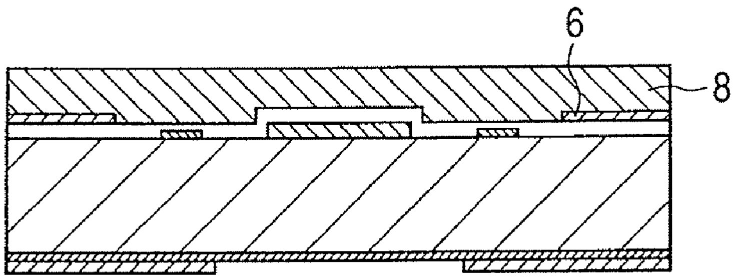

Next, as shown in FIG. 6C, the flow path forming material 8 is laminated on the adhesive layers 6. As the flow path forming material 8, the materials shown in the first and the second embodiments can be suitably used.

Figure 6D:
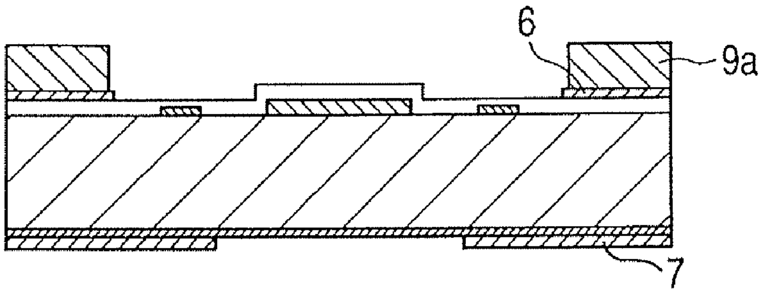

Next, as shown in FIG. 6D, the flow path forming material 8 is patterned to form the flow path side walls 9*a*.

The processes on and after the one shown in FIG. 6D can be performed similarly to those illustrated in FIG. 3D-3G of the first embodiment.

If the present embodiment is adopted, both of the photosensitive adhesive materials and non-photosensitive adhesive materials can be selected as the adhesive material 6*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-025777, filed Feb. 2, 2006, which is hereby incorporated by reference herein in its entirety.

What is claimed is:

1. A method of manufacturing an ink jet recording head including a substrate equipped with an energy generating element for generating energy to discharge ink and a supply port for supplying the ink to the energy generating element, a discharge port for discharging the ink, and a flow path forming member for forming a flow path for allowing communication between the discharge port and the supply port, said method comprising the steps of:

providing an adhesive material for forming an adhesive layer on the substrate;

providing a photosensitive material containing a photosensitive resin on the adhesive material, and performing exposure and development to form a side wall forming member for forming a side wall of the flow path;

patterning the adhesive material using the side wall forming member as masks to form the adhesive layer;

placing a ceiling layer on the side wall forming member, the ceiling layer being a part of the flow path forming member; and forming the discharge port in the ceiling layer.

2. The method of manufacturing an ink jet recording head according to claim 1, wherein the ceiling layer is made of a photosensitive material, and the discharge port is formed by exposing and developing the photosensitive material of the ceiling layer.

3. The method of manufacturing an ink jet recording head according to claim 1, wherein the adhesive material contains a polyether amide resin.

4. The method of manufacturing an ink jet recording head according to claim 1, wherein the adhesive material is formed of a cured material of an epoxy resin.

5. The method of manufacturing an ink jet recording head according to claim 1, wherein the patterning of the adhesive material is performed by dry etching.

* * * * *